United States Patent [19]

Ripkens et al.

[11] Patent Number: 4,525,227

[45] Date of Patent: Jun. 25, 1985

[54] PROCESS FOR THE MANUFACTURE OF MULTI-LAYER PARTICLE BOARD USING A PHENOL FORMALDEHYDE RESIN HAVING A LOWER SOLIDS CONTENT

[75] Inventors: Gerd Ripkens, Kamp-Lintfort; Hans Schittek, Neukirchen-Vluyn; Adolf Buschfeld, Alpen, all of Fed. Rep. of Germany

[73] Assignee: Deutsche Texaco Aktiengesellschaft, Hamburg, Fed. Rep. of Germany

[21] Appl. No.: 557,785

[22] Filed: Dec. 5, 1983

Related U.S. Application Data

[63] Continuation-in-part of Ser. No. 414,268, Sep. 2, 1982, abandoned, which is a continuation of Ser. No. 202,529, Oct. 31, 1980, abandoned.

[30] Foreign Application Priority Data

Nov. 2, 1979 [DE] Fed. Rep. of Germany ....... 2944178

[51] Int. Cl.$^3$ ........................... B29J 5/00; B32B 17/00
[52] U.S. Cl. .................................. 156/62.2; 156/307.3; 156/308.8; 156/335; 264/112; 264/113; 428/529
[58] Field of Search ................ 156/62.2, 307.3, 308.8, 156/335; 428/402, 525, 524, 529; 264/113, 112, 122

[56] References Cited

U.S. PATENT DOCUMENTS

| | | | |
|---|---|---|---|
| 3,076,772 | 2/1963 | Christ | 156/335 |
| 3,108,990 | 10/1963 | Baxter | 156/335 |
| 3,864,291 | 2/1975 | Enkist | 156/335 |
| 3,931,072 | 1/1976 | Coyle | 156/335 |
| 3,968,308 | 7/1976 | Buschfeld et al. | 156/307.3 |
| 4,105,606 | 8/1978 | Forss et al. | 156/335 |

Primary Examiner—S. L. Childs
Attorney, Agent, or Firm—Robert A. Kulason; James F. Young; James J. O'Loughlin

[57] ABSTRACT

A process for the manufacture of triple- and multi-layer particle board employing phenol formaldehyde resin compositions for gluing particles in the outer layers of the board characterized by the use of a phenol formaldehyde resin composition having a viscosity of about 30–90 seconds (4-mm DIN cup), a solids content of between about 30 and 39 percent by weight and an alkali content of less than 8 percent by weight is provided.

4 Claims, No Drawings

PROCESS FOR THE MANUFACTURE OF MULTI-LAYER PARTICLE BOARD USING A PHENOL FORMALDEHYDE RESIN HAVING A LOWER SOLIDS CONTENT

This is a continuation-in-part of application Ser. No. 414,268, filed Sept. 2, 1982, which was a continuation of Ser. No. 202,529 filed Oct. 31, 1980, both now abandoned.

BACKGROUND OF THE INVENTION

Up to now, outer layers of triple- and multi-layer particle board have been prepared using the same phenolic resin glues as in the center layers. Whilst the high reactivity of such 45–48% aqueous resins is of advantage in the center layers, it causes embrittlement of the surface in the outer layers. Moreover, owing to the high alkalinity of such resins required for rapidly thermosetting center-layer resins having customary solids contents and viscosities, alkali-rich dust is obtained when grinding such particle board. On incineration this dust destroys the furnaces.

In view of the above mentioned difficulties special phenolic resins for outer layers of particle board were developed several years ago. The disadvantages were removed by lowering the alkali content of 45–48% resins from 9% and more and by lowering at the same time the formaldehyde content in order to reduce the reactivity and secure sufficient storage stability.

The phenol content in resins was thus raised by approx. 40%. Hence the price of the new outer-layer resins and consequently of the particle board prepared therefrom increased appreciably because the amount of solid resin applied to the particles could not be lowered despite the higher phenol content in the resin solutions in order not to deteriorate the particle board properties.

A method has now been discovered for the manufacture of multi-layer particle board allowing the use of phenolic resin binders for gluing particles in the outer layers. The new binders are employed in smaller amounts at comparably lower alkali contents.

DESCRIPTION OF THE PRIOR ART

U.S. Pat. No. 3,968,308 discloses a process for the manufacture of chip boards using condensation resins and binders and product. The disclosure of this patent is incorporated herein by reference.

A future development of the instant process is set forth in coassigned U.S. patent application Ser. No. 365,770 filed Apr. 5, 1982.

SUMMARY OF THE INVENTION

In accordance with this invention, a process for the manufacture of triple- and multi-layer particle board employing formaldehyde resins for gluing particles in the outer layers of the board is provided. The process is characterized by the use of a phenol formaldehyde resin composition having a viscosity of about 30–90 seconds (4-mm DIN cup), a solids content of between about 30 and 39 percent by weight, and an alkali content of less than 8 percent by weight, preferably between about 2 and 6 percent by weight.

It has been surprisingly found that by molecular enlargement of such resins outer-layer phenolic resins are obtained which present the known advantages of alkali-poor resins and furthermore, have a noticeable better quality so that the solids content relative to the particle can be lowered by 30 percent and more. Hence, the novel outerlayer resins for particle board are obtained by condensation in order to form very large molecules, the alkali contents in and the viscosities of the resin solutions remaining unchanged, namely about 30–90 seconds, preferably about 40–70 seconds (4-mm DIN cup). The resin composition consists essentially of the reaction product of an aldehyde, phenol, an alkali, and water. These resin compositions contain only about 30–39 percent by weight solids, preferably about 30 to 37 percent by weight, and more preferably 33 to 37 percent by weight instead of 45–48 percent by weight which is still customary. The lower storage stability due to the noticeably larger molecular structure can be offset by lowering the formaldehyde content in the resins. The formaldehyde content is thus dependent on the desired storage stability.

The molecular weight and the degree of condensation is defined by the solids content, the viscosity, and the alkali content. The lower the solids content, the higher the viscosity and the higher the alkali content of the resin composition, the higher is the degree of condensation. This means that with a given solids content and a given alkali content the molecular weight is the higher, the higher the viscosity of the resin is; or with a given viscosity and a given alkali content the molecular weight is the higher, the lower the solids content of the resin solution is, and finally, that with a given solids content and a given viscosity the molecular weight is the higher, the higher the alkali content of the resin is.

The solids content in a resin is defined as the residue obtained after evaporation of water and possibly low-molecular compounds under specified conditions (1 gram, 120° C., 2 hours). As a rule, the solids content in particle board binders is by 5 to 7% lower than the theoretical value. This is mainly due to the release of reaction water.

The phenol formaldehyde resin composition may be replaced by resins made of formaldehyde or other lower aldehydes with 1 to 4 carbon atoms and alkyl derivatives of phenol with 1 to 9, preferably 1 to 4, carbon atoms in the alkyl group.

The high quality of the new outer-layer resins allows lowering the gluing factor, i.e. the amount of solid resin required per absolutely dry particle, from 11–12% to about 8% without impairing the quality. The water content in the particle mat may result in higher or lower moisture of the glued particles depending on the solids content in the resin solution and the gluing factor at a given particle moisture. For instance, a 37% resin (glue application 8%; 13.6 kgs moisture per 100 kgs of absolutely dry particle) corresponds to a conventional 45% phenolic resin (glue application 11.2%).

In the formation of the resin composition, the molar ratio of phenol and formaldehyde can be from about 1:1.0 to 1:3.0, preferably about 1:1.5 to 1:2.5, and most preferably about 1:1.8 to 1:2.2. The alkali content of the resin composition set forth as the molar ratio of phenol to sodium hydroxide can vary from about 1:0.2 to 1:0.8, preferably about 1:0.3 to 1:0.7 and most preferably about 1:0.4 to 1:0.6. The formation of the resin composition can occur at temperatures between about 70° and 100° C. even though temperatures outside this range can also be useful.

Qualitative evaluation of the novel high-molecular phenolic resins for use in the outer layers of particle board in comparison with a conventional 45% outer-layer phenolic resin was carried out employing triple-layer particle board specimens the center layer particles of which had been glued with a conventional, alkali-rich 45% aqueous phenolic resin.

The superior quality of the new phenolic resins in outer layers of particle board is demonstrated in the following examples:

EXAMPLES

TABLE I

| Composition of the Resins (Parts by Weight) | | | |
|---|---|---|---|
| | A | B | Standard Resin |
| Resin | | | |
| Phenol | 234 | 218 | 284 |
| Formalin (37%) | 403 | 294 | 547 |
| Sodium Hydroxide Solution (50%) | 98 | 93 | 94 |
| Water | 265 | 295 | 75 |
| Characteristics | | | |
| Solids, % | 37 | 35 | 45 |
| Viscosity, seconds (4 mm DIN cup) | 43 | 35 | 45 |
| Gel Time, min. (at 100° C.) | 27 | 21 | 25 |

These resins can be manufactured in accordance with the known conventional processes.

Preparation of Outer-Layer Resins A and B

Resin A

Fill 234 parts of phenol and 403 parts of formalin (37%) into a flask. Heat to 70° C. Add 98 parts of sodium hydroxide solution (50%) within a period of 60 minutes. Charge 265 parts of water and raise the temperature to 80° C. Cool the product when a viscosity of 43 seconds (4-mm DIN cup) is attained.

Resin B

Prepare this resin accordingly (see table I for the required amounts).

Preparation of the Center-Layer Resin

Fill 203 parts by weight of phenol and 463 parts by weight of formalin (37%) into a flask. Heat to 80° C. Add 98 parts by weight of sodium hydroxide solution (50%) to the reaction mixture within a period of two hours. Cool the resin solution to 70° C. When a viscosity of 50 seconds (8-mm DIN cup) is attained, dilute with 174 parts of sodium hydroxide solution (50%) and 62 parts of water. Cool the resin.

This 45% resin was employed as a center-layer binder in the experiments.

The resins were tested in 16-mm thick triple-layer particle board. The outer layer/center layer particle ratio in the test specimens was 35:65. The glue application to the particles which had been dried in order to lower the moisture to approx. 5% was 8% solids, relative to absolutely dry wood for the resins A and B, and 11% for the standard resin. In each of the cases the center-layer particles were glued with 8% conventional, alkali-rich phenolic resin relative to solids. The moisture of the glued center-layer particles was 11.6% prior to pressing.

In each of the cases the particles were water-proofed with 1% paraffin relative to absolutely dry wood.

The particles were pressed for four minutes at 180° C. The gross density of the particle board ranged between 680 and 690 kgs/m³.

TABLE II

| Particle Board Characteristics | | | |
|---|---|---|---|
| Outer-Layer Resin | A | B | Standard |
| Resin Application, % absol. dry/absol. dry wood | 8 | 8 | 11 |
| Particle Moisture, % | 17.3 | 18.3 | 17.4 |
| Flexural Strength N/mm² | 20.5 | 21.2 | 19.7 |
| Swelling, % after 24 hrs. | 9.6 | 9.5 | 9.6 |

It has thus been demonstrated that particle board manufactured in accordance with the present invention has the same strength values as conventional panels while noticeably less solid material and hence less resin is needed.

What is claimed is:

1. In a process for producing a multi-layer particle board having both an inner layer and an outer layer of glued particle board, the improvement which comprises forming said outer layer by gluing particles together into said outer layer with a resin composition comprising very large molecules formed by the condensation of a sufficient quantity of phenol with formaldehyde or another lower aldehyde having from 1 to 4 carbon atoms to produce a resin composition having a solids content of from about 30 to 39 percent by weight, said resin composition having an alkali content between about 2 and 6 percent by weight and a viscosity of from about 30 to 90 seconds (4-mm DIN cup), said resin composition consisting essentially of the reaction product of said formaldehyde or lower aldehyde, said phenol, alkali and water.

2. The process of claim 1 wherein said solids content comprises between about 30 and 37% by weight.

3. The process of claim 1 wherein said solids content comprises between about 33 and 37% by weight.

4. The process of claim 1 wherein said particles comprise wood.

* * * * *